(12) United States Patent
Borrmann

(10) Patent No.: US 12,023,725 B2
(45) Date of Patent: Jul. 2, 2024

(54) APPARATUS FOR THREADING A TOOL UNIT ONTO AN ELONGATE STRUCTURAL ELEMENT

(71) Applicant: Airbus Operations GmbH, Hamburg (DE)

(72) Inventor: Christof Borrmann, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/182,916

(22) Filed: Mar. 13, 2023

(65) Prior Publication Data

US 2023/0302528 A1 Sep. 28, 2023

(30) Foreign Application Priority Data

Mar. 28, 2022 (EP) .................................... 22164713

(51) Int. Cl.
*B21J 15/12* (2006.01)
*B21J 15/02* (2006.01)
(Continued)

(52) U.S. Cl.
CPC .............. *B21J 15/12* (2013.01); *B21J 15/022* (2013.01); *B21J 15/26* (2013.01); *B21J 15/30* (2013.01); *B23P 19/107* (2013.01); *B21J 15/142* (2013.01)

(58) Field of Classification Search
CPC ...... B23P 19/107; B21J 15/022; B21J 15/105; B21J 15/12; B21J 15/142; B21J 15/26; B21J 15/30; B25J 11/007
See application file for complete search history.

(56) References Cited

U.S. PATENT DOCUMENTS 5,527,140 A 6/1996 Mages et al.
8,490,275 B2 * 7/2013 Kott .......................... B21J 15/12
29/524.1

(Continued)

FOREIGN PATENT DOCUMENTS

CN 105643262 A 6/2016
CN 110142371 A * 8/2019 .............. B21J 15/20
(Continued)

OTHER PUBLICATIONS

European Search Report for European Patent Application No. 22164713.4 dated Sep. 8, 2022; priority document.

*Primary Examiner* — Matthew P Travers
(74) *Attorney, Agent, or Firm* — Greer, Burns & Crain, Ltd.

(57) ABSTRACT

An apparatus for threading a tool unit onto an elongate structural element. The apparatus has a holding arrangement for holding it on a feed device, a tool unit to be threaded onto the elongate structural element. The tool unit has a tool axis and a vibration unit connected to the tool unit and configured to generate a periodic force in at least one first spatial direction that runs transversely with respect to the tool axis. First and second coupling components, held elastically on one another, are provided. The first coupling component is connected to the holding arrangement, the second coupling component is connected to the tool unit. The vibration unit is operated, during a feed movement of the holding arrangement for threading the tool unit onto the elongate structural element, to add an additional, periodically varying transverse component to a feed force acting on the tool unit.

12 Claims, 1 Drawing Sheet

(51) Int. Cl.
*B21J 15/14* (2006.01)
*B21J 15/26* (2006.01)
*B21J 15/30* (2006.01)
*B23P 19/10* (2006.01)

(56) References Cited

U.S. PATENT DOCUMENTS

| | | |
|---|---|---|
| 8,914,958 B2 | 12/2014 | Shinohara et al. |
| 11,033,952 B2 | 6/2021 | Chan et al. |
| 2010/0180424 A1* | 7/2010 | Le Vacon ................ B23P 19/06 29/505 |

FOREIGN PATENT DOCUMENTS

| | | |
|---|---|---|
| DE | 4124787 C2 | 5/1994 |
| FR | 3069589 A1 | 2/2019 |

* cited by examiner

APPARATUS FOR THREADING A TOOL UNIT ONTO AN ELONGATE STRUCTURAL ELEMENT

CROSS-REFERENCES TO RELATED APPLICATIONS

This application claims the benefit of European Patent Application Number 22 164 713-4 filed on Mar. 28, 2022, the entire disclosure of which is incorporated herein by way of reference.

FIELD OF THE INVENTION

The present invention relates to an apparatus and a method for threading a tool unit onto an elongate structural element.

BACKGROUND OF THE INVENTION

To connect shell elements during the construction of aircraft, use is made primarily of rivet elements, which produce simple, testable and reliable connections. For this purpose, the shell elements that are to be connected are jointly drilled, and a rivet is subsequently inserted manually or in automated fashion into the through bore from the outside. This rivet then protrudes on the inside of the shell. After a collar has been applied to the protruding end, said collar is crimped together with the rivet using a manual riveting tool. For this purpose, the riveting tool must be fully threaded onto the rivet.

To automate the process of crimping the rivet, it is common for an apparatus to be used to automatically perform a threading movement of the riveting tool onto the rivet. Since both the formation of the common bore and the insertion of the rivet involve tolerances, known automated solutions use complex measurement and control sequences that can ensure an automatic threading-on operation. For this purpose, sensors are used to detect the position and angle deviations in order to ensure exact alignment between the tool axis and the rivet axis. This involves complex control, high investment costs and increased process times. An incorrect orientation of the riveting tool relative to the rivet could result in misalignment and in damage to the rivets and/or to the structural parts that are to be connected.

SUMMARY OF THE INVENTION

An object of the present invention is to provide an apparatus for threading a tool onto an elongate structural element, which can be used easily, reliably and inexpensively.

This object may be achieved one or more embodiments of the present invention. This and further embodiments will emerge from the following description.

An apparatus for threading a tool unit onto an elongate structural element, according to one or more embodiments comprises a holding arrangement for holding the apparatus on a feed device, a tool unit which is to be threaded onto the elongate structural element and which has a tool axis, a vibration unit which is connected to the tool unit and which is configured to generate a periodic force in at least one first spatial direction that runs transversely with respect to the tool axis, and an elastic coupling unit with a first coupling component and with a second coupling component, which are held elastically on one another, wherein the first coupling component is connected to the holding arrangement, wherein the second coupling component is connected to the tool unit, and wherein the apparatus is configured to operate the vibration unit, during a feed movement of the holding arrangement for threading the tool unit onto the elongate structural element, in order to add an additional, periodically varying transverse component to a feed force acting on the tool unit, which transverse component serves to counteract a misalignment of the tool unit on the elongate structural element.

The tool unit that is to be threaded onto the elongate structural element may be attached to the holding arrangement. The holding arrangement may be connected to a feed device that moves the tool unit in the direction of the elongate structural element. The feed device could be fastened in movable or displaceable fashion to a framework at a construction station for processing a fuselage or other structural parts, in order that said feed device can be moved successively to several positions with elongate structural elements.

In one embodiment, the holding arrangement could be designed as a frame or housing and configured to hold the tool unit and the vibration unit on the coupling unit. The coupling unit could furthermore also be arranged directly on the feed device, such that the holding arrangement in this case merely forms an interface between the feed device and the coupling unit and could be formed by one or more fastening means.

The tool unit could be a riveting tool and have a processing head that is to be threaded onto the structural element. Ideally, the tool axis of the tool unit coincides with the axis of extent of the elongate structural element. As mentioned in the introduction, this can be achieved in the prior art through cumbersome orientation of the tool unit. According to the invention, however, it is instead the case that the vibration unit is used to enforce a periodically changing orientation of the tool unit during the feed movement of the tool unit, whereby misalignment with respect to the elongate structural element is prevented. For this purpose, the tool unit is connected to the holding arrangement not rigidly but flexibly via the elastic coupling unit.

Owing to an elastic connection between the two coupling components, these can move relative to one another when the tool unit is threaded onto the elongate structural element. Here, the mobility of the elastic coupling unit is preferably selected such that the tool unit is structurally always capable of orienting the tool axis in alignment with the axis of extent of the elongate structural element. The position tolerances of the tool axis are consequently greater than the position tolerances of the elongate structural element.

Actual targeted orientation of the tool unit into a single precisely determined position is however not enforced. Instead, a periodic force transverse with respect to the tool axis is generated by means of the vibration unit, such that the tool unit always follows the transverse force to a certain degree, and in so doing elastically deforms the elastic coupling unit. The tool unit consequently oscillates around a neutral situation, such that the tool axis vibrates about the axis of extent of the structural element whilst the tool unit is pushed further onto the structural element by the feed device. If the tool unit is for example initially situated obliquely on the elongate structural element, a purely translational feed movement would result in misalignment between the structural element and the tool unit. Since a slight periodic oscillating movement transverse with respect to the tool axis is however performed by the vibration unit, incipient misalignment can always be immediately eliminated again through variation of the orientation.

In one advantageous embodiment, the vibration unit has an electric motor with an eccentric mass. The electric motor may have a shaft on which the eccentric mass is arranged. The shaft may also be equipped with an eccentric mass at each of two mutually opposite end sides of the electric motor. The size and eccentricity of the mass determines the transverse force that is generated by the vibration unit, whilst the rotational speed of the electric motor determines the frequency of the periodic transverse force.

In an alternative embodiment, the vibration unit may also be of pneumatic configuration. The vibration unit can then be supplied with compressed air at the same time as a pneumatic tool unit, for example.

In one advantageous embodiment, the elastic coupling unit is configured to generate an offset of the two coupling components at least in one plane. For this purpose, the two coupling components could for example always move parallel to one another, but be movable laterally and in the feed direction. It is conceivable here that the two coupling halves also allow a rotation relative to one another. The tool axis could then oscillate back and forth at least in one spatial direction.

In one advantageous embodiment, the elastic coupling unit is configured to rotate the two coupling components relative to one another. As mentioned above, a rotation could be possible in at least one spatial direction if the two coupling components remain parallel to one another. It is however also conceivable for rotation or tilting about further axes that run transversely with respect to the tool axis to be allowed. For this purpose, the two coupling components are configured such that they can be oriented obliquely with respect to one another, that is to say can perform a wobbling movement relative to one another, and thus enclose a variable and non-uniform intermediate space between them. This could be achieved by means of an arrangement of spring elements which are arranged between mutually facing surfaces of the two coupling components and which have a spring action acting transversely with respect to the surfaces. The freedom of movement of the tool unit is thus further increased.

In one advantageous embodiment, the coupling components are resiliently elastically forced into a neutral situation. A vibration-induced oscillating movement about the neutral situation will arise when the tool unit is in the unloaded state. If the tool unit temporarily becomes jammed during a feed movement onto the structural element, the jamming is immediately eliminated again when the tool unit performs a sufficient deflecting movement. The tool unit is subsequently forced in the direction of the neutral situation again.

In one advantageous embodiment, the elongate structural element is a rivet, wherein the tool unit has a riveting tool that is configured to crimp a collar, which has been pushed onto the elongate structural element, together with the structural element. The collar may be pushed manually onto the rivet before the tool unit is threaded on. It is also conceivable for the tool unit to be configured to push the collar on during the threading-on operation. To install the collar on the rivet, the tool unit that has been mounted onto the rivet grips the rivet and is at the same time supported on the collar. The exertion of a pulling action on a tensile part that is provided on the rivet causes the collar and the rivet to be crimped together, with the collar being molded into grooves of the rivet, which are provided for this purpose. This operation is complete when the riveting tool makes contact with the surface, surrounding the rivet, of the parts for joining, wherein an increasing tensile stress in the rivet causes this to break at a predetermined breaking point above the collar and facing toward the tool unit.

In one advantageous embodiment, the apparatus is configured to operate the vibration unit during the feed movement and to deactivate the vibration unit when an intended end position of the first structural element is reached. It can thus be ensured that the tool unit is subjected to a transverse force by the vibration unit at all times during the feed movement in order to counteract jamming or misalignment.

In one advantageous embodiment, the apparatus furthermore has a feed unit, wherein the feed unit is connected to the holding arrangement. The feed unit is in particular a linear feed unit, which may comprise a guide apparatus and a drive apparatus. The drive apparatus may be hydraulic, pneumatic or electrical. A pneumatic drive apparatus could be expedient if the tool unit and/or the vibration unit likewise operate pneumatically.

In one advantageous embodiment, the feed unit and the vibration unit have a control connection to one another, such that the vibration unit is operated when the feed unit is operated. It is thus ensured that the vibration unit is operated exactly when the risk of jamming or misalignment exists.

In one embodiment, the elastic coupling unit is configured to be locked such that mobility between the first coupling component and the second coupling component is avoided during the crimping operation. The elastic coupling unit could for example have a pneumatic arresting device that fixes the two coupling components to one another such that their presently set position is maintained. A consistent orientation of the tool unit can thus be maintained during the crimping operation, which assists the crimping process and prevents an undesired deflection of the tool unit during the pulling of the structural element.

The invention furthermore relates to a method for threading a tool unit onto an elongate structural element by holding the tool unit on a holding arrangement by means of an elastic coupling unit with a first coupling component and with a second coupling component, which are held elastically on one another, guiding and moving the holding arrangement in the direction of the elongate structural element by means of a feed device, and, during the movement, operating a vibration unit which is connected to the tool unit and which is configured to generate a periodic force in at least one first spatial direction running transversely with respect to a tool axis such that, during the movement, an additional, periodically varying transverse component is added to a feed force acting on the tool unit, which transverse component serves to counteract a misalignment of the tool unit on the elongate structural element.

In one advantageous embodiment, the elongate structural element is a rivet and the tool unit is a riveting tool, the method furthermore comprising crimping a collar, which has been pushed onto the elongate structural element, by means of the tool unit.

In one advantageous embodiment, the vibration unit is operated during the feed movement and the vibration unit is deactivated when an intended end position of the elongate structural element is reached.

In one advantageous embodiment, the feed unit and the vibration unit have a control connection to one another, the method comprising operating the vibration unit when the feed unit is operated.

BRIEF DESCRIPTION OF THE DRAWINGS

Exemplary embodiments will be discussed in more detail below on the basis of the appended drawings. The illustrations are schematic and not true to scale. The same reference designations are used to denote identical or similar elements. In the drawings.

DETAILED DESCRIPTION OF THE PREFERRED EMBODIMENTS

Figure 1:
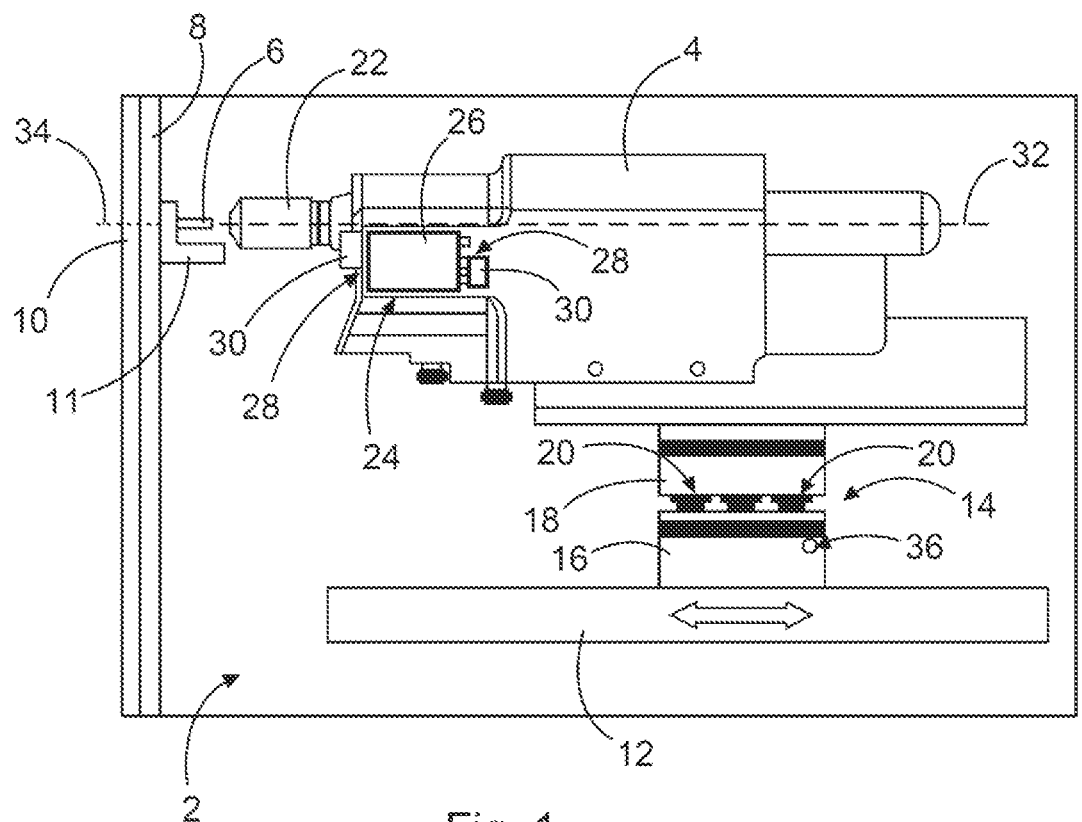
FIG. 1 is a schematic illustration of an apparatus according to an exemplary embodiment.

FIG. 1 shows an apparatus 2 for threading a tool unit 4 onto an elongate structural element 6. Here, the elongate structural element 6 is a rivet which is inserted into a common opening of three structural parts 8, 10, and 11 that are to be connected to one another, and which protrudes from one of the structural parts 11. The structural parts 8 and 10 could for example be shell elements for a fuselage of an aircraft. The structural part 11 could be a stringer which bears flush against the shell element 8 and which serves to stiffen the fuselage in a longitudinal direction. A holding arrangement 12, like a platform or other supporting structure, is provided, to which the tool unit 4 is fastened via an elastic coupling unit 14. The elastic coupling unit 14 has a first coupling component 16 and a second coupling component 18. Here, by way of example, the first coupling component 16 is connected to the holding arrangement 12, whereas the second coupling component 18 is connected to the tool unit 4. The two coupling components 16 and 18 are coupled to one another elastically via spring elements 20, such that their relative orientation with respect to one another can change. In the illustration shown, the two coupling components 16 and 18 are in a neutral situation, in which the two coupling components 16 and 18 are oriented parallel to one another.

The tool unit 4 has a tool axis 32. This is for example parallel to mutually facing surfaces of the two coupling components 16 and 18. A suitable embodiment of an elastic coupling unit 14 is for example a compensation unit in which two coupling components, which are often cylindrical, are connected to one another elastically by means of interposed spring elements, which are often adjustable.

By virtue of the holding arrangement 12 being moved, the tool unit 4 can be pushed or threaded onto the structural element 6 by means of a processing head 22. To improve the threading-on operation, a vibration unit 24 is provided, which is attached to the tool unit 4. By way of example, said vibration unit has an electric motor 26, on the shaft ends 28 of which there is arranged in each case one eccentric mass 30. When the electric motor 26 is operated, a transverse force oriented transversely with respect to a tool axis 32 is generated periodically, which transverse force causes the tool unit 4 to oscillate slightly owing to the elastic coupling unit 14. The intensity of the oscillating movement is dependent here on the size of the eccentric masses 30 and on the rotational speed of the electric motor 26.

When the processing head 22 is situated on the structural element 6, continuous vibration can prevent misalignment between the structural element 6 and the processing head 22 during the feed movement of the tool unit 4. Precise alignment of the tool axis 32 with an axis of extent 34 of the structural element 6 is not necessary, because the relative orientation of the processing head 22 and of the structural element 6 continuously changes, and misalignment is thus prevented.

When the tool unit 4 has been fully threaded onto the structural element 6, the vibration unit 24 can be deactivated, and the tool unit 4 could perform a processing operation. In this processing operation, it would for example be possible for a collar that has been pushed onto the structural element 6, or which has been pushed on by the tool unit 4 itself, to be crimped together with the structural element 6. Said structural element is for example in the form of a rivet.

It is furthermore conceivable for the elastic coupling unit 14 to have a connector 36 that is connectable to a compressed-air line. The introduction of compressed air can effect locking of the elastic coupling unit 14 in a present position, such that the tool unit 4 is reliably supported on the holding arrangement 12 during the crimping operation.

Figure 2:
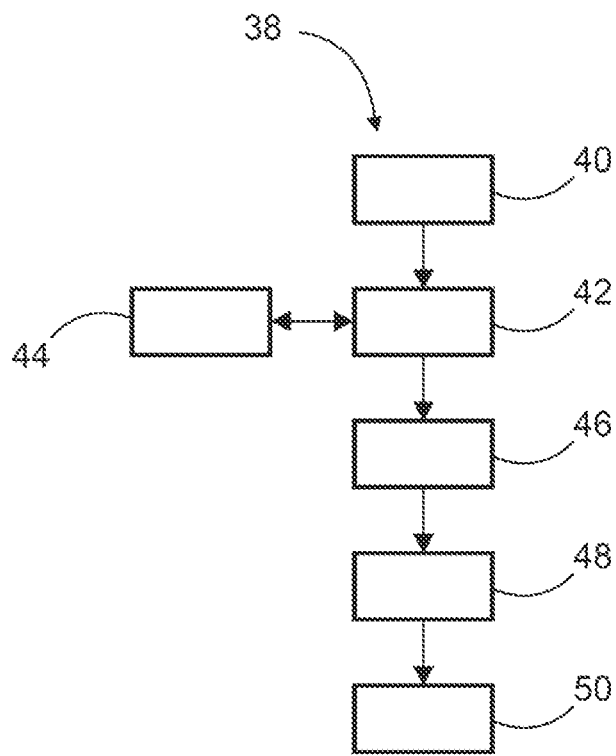
FIG. 2 is a schematic illustration of a method according to an exemplary embodiment.

FIG. 2 schematically shows a method 38 for threading the tool unit 4 onto the elongate structural element 6, comprising the steps of holding 40 the tool unit 4 on the holding arrangement 12 by means of the elastic coupling unit 14 with a first coupling component 16 and a second coupling component 18, which are held elastically on one another. The holding arrangement 12 is guided and moved 42 in the direction of the elongate structural element 6 by means of the feed device. During the movement 42, the vibration unit 24 which is connected to the tool unit 4 is operated 44 in order to generate a periodic force in at least one first spatial direction that runs transversely with respect to a tool axis 32. Consequently, during the movement 42, an additional, periodically varying transverse component is added to a feed force acting on the tool unit 4, which transverse component serves to counteract a misalignment of the tool unit 4 on the elongate structural element 6. After the threading-on operation, the elastic coupling unit 14 can be locked 46. The vibration unit 24 is then deactivated 48. The tool unit 4 can subsequently perform a processing operation 50, for example the crimping of a collar on the elongate structural element 6.

It is additionally pointed out that the expressions "comprising" or "having" do not rule out other elements or steps, and "a" or "an" not rule out a multiplicity. It is furthermore pointed out that features or steps that have been described with reference to one of the above exemplary embodiments may also be used in combination with other features or steps of other exemplary embodiments described above. Reference designations in the claims are not to be regarded as limiting.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE DESIGNATIONS

2 Apparatus
4 Tool unit
6 Elongate structural element
8 Structural part/shell element 10 Structural part/shell element
11 Structural part/stringer
12 Holding arrangement
14 Elastic coupling unit
16 First coupling component
18 Second coupling component
20 Spring element
22 Processing head
24 Vibration unit
26 Electric motor
28 Shaft end
30 Eccentric mass
32 Tool axis
34 Axis of extent
36 Connector
38 Method
40 Holding
42 Guiding and moving
44 Operating vibration unit
46 Locking elastic coupling unit
48 Deactivating vibration unit
50 Performing processing operation

The invention claimed is:

1. An apparatus for threading a tool unit onto an elongate structural element, the apparatus comprising:
   a tool unit which is to be threaded onto the elongate structural element and which has a tool axis,
   a holding arrangement for holding the tool unit on a feed unit,
   a vibration unit which is connected to the tool unit and which is configured to generate a periodic force in at least one first spatial direction that runs transversely with respect to the tool axis, and
   an elastic coupling unit with a first coupling component and with a second coupling component, which are held elastically on one another,
   wherein the first coupling component is connected to the holding arrangement,
   wherein the second coupling component is connected to the tool unit, and
   wherein the apparatus is configured to operate the vibration unit, during a feed movement of the holding arrangement for threading the tool unit onto the elongate structural element, in order to add an additional, periodically varying transverse component to a feed force acting on the tool unit,
   wherein the elongate structural element is a rivet, and
   wherein the tool unit has a riveting tool that is configured to crimp a collar, which has been pushed onto the elongate structural element, together with the structural element.

2. The apparatus according to claim 1, wherein the vibration unit has an electric motor with an eccentric mass.

3. The apparatus according to claim 1, wherein the elastic coupling unit is configured to generate an offset of the first and second coupling components at least in one plane.

4. The apparatus according to claim 1, wherein the elastic coupling unit is configured to rotate the first and second coupling components relative to one another.

5. The apparatus according to claim 1, wherein the first and second coupling components are resiliently elastically forced into a neutral configuration.

6. The apparatus according to claim 1, wherein the elastic coupling unit is configured to be locked such that mobility between the first coupling component and the second coupling component is avoided during the crimping of the collar.

7. The apparatus according to claim 1, wherein the apparatus is configured to operate the vibration unit during the feed movement and further configured to deactivate the vibration unit when an intended end position of the elongate structural element is reached.

8. The apparatus according to claim 1, further comprising:
   the feed unit, wherein the feed unit is connected to the holding arrangement.

9. The apparatus according to claim 8, wherein the feed unit and the vibration unit have a control connection to one another, such that the vibration unit is operated when the feed unit is operated.

10. A method for threading a tool unit onto an elongate structural element, the method comprising:
    holding the tool unit on a holding arrangement with an elastic coupling unit comprising a first coupling component and with a second coupling component, which are held elastically on one another,
    guiding and moving the holding arrangement in a direction towards the elongate structural element with a feed unit, and,
    during the moving, operating a vibration unit which is connected to the tool unit and which is configured to generate a periodic force in at least one first spatial direction running transversely with respect to a tool axis of the tool unit such that, during the moving, an additional, periodically varying transverse component is added to a feed force acting on the tool unit,
    wherein the elongate structural element is a rivet, and
    wherein the tool unit has a riveting tool, and,
    wherein the method further comprises:
    crimping a collar, which has been pushed onto the elongate structural element, with the tool unit.

11. The method according to claim 10, wherein the vibration unit is operated during the moving, and the vibration unit is deactivated when an intended end position of the elongate structural element is reached.

12. The method according to claim 10, wherein the feed unit is connected to the holding arrangement,
    wherein the feed unit and the vibration unit have a control connection to one another, and
    wherein the method further comprises:
    operating the vibration unit when the feed unit is operated.

* * * * *